No. 833,369. PATENTED OCT. 16, 1906.
G. H. CHANDLER.
CRANBERRY PICKER.
APPLICATION FILED DEC. 27, 1904.
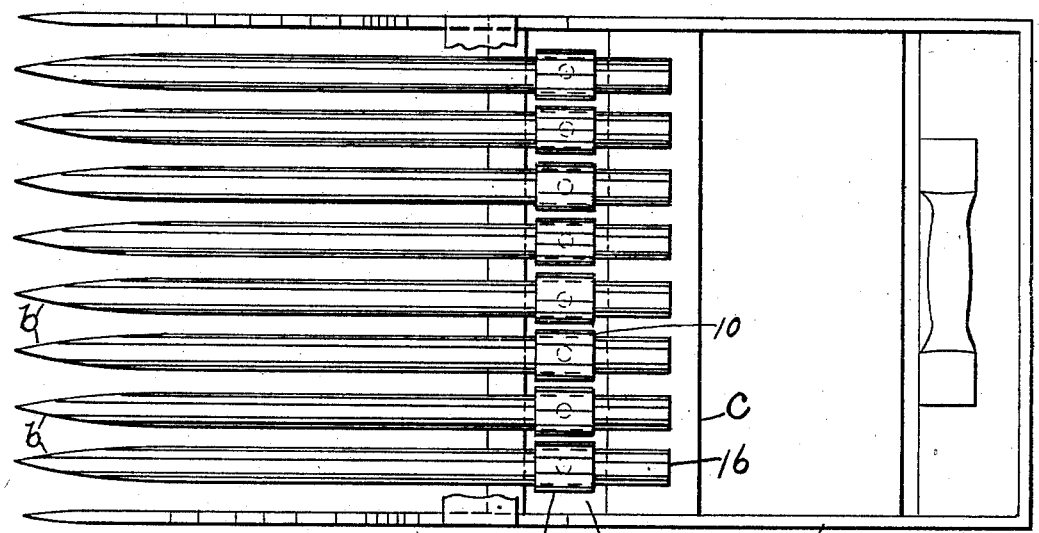
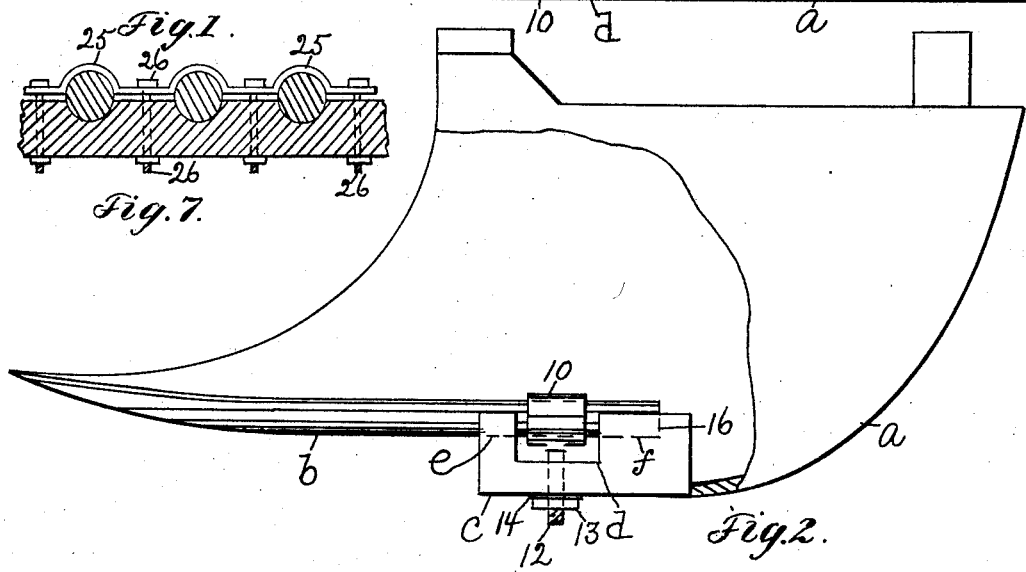
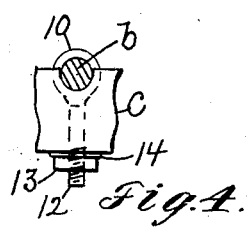
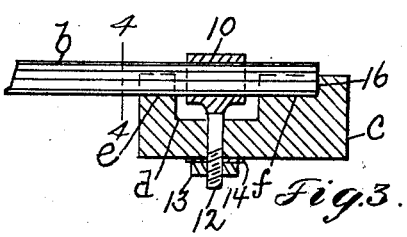
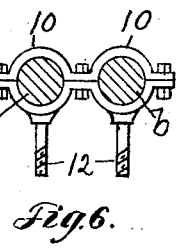
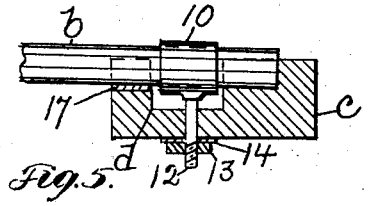
Witnesses.
C. H. Bennett
J. Murphy
Inventor.
George H. Chandler
by Jas. H. Churchill
Atty.
THE NORRIS PETERS CO., WASHINGTON, D. C.

UNITED STATES PATENT OFFICE.

GEORGE H. CHANDLER, OF MARSHFIELD, MASSACHUSETTS.

CRANBERRY-PICKER.

No. 833,369.

Specification of Letters Patent.

Patented Oct. 16, 1906.

Application filed December 27, 1904. Serial No. 238,336.

*To all whom it may concern:*

Be it known that I, GEORGE H. CHANDLER, a citizen of the United States, residing in Marshfield, in the county of Plymouth and State of Massachusetts, have invented an Improvement in Cranberry-Pickers, of which the following description, in connection with the accompanying drawings, is a specification, like characters on the drawings representing like parts.

This invention relates to a cranberry-picker, and has for its object to improve the construction and efficiency of the same.

Cranberry-pickers as now commonly constructed and known to me are provided with tines or teeth made either of wood or of metal, straight or curved. However, the curved wooden tooth is more generally used, but has the disadvantage of warping or springing from heat, moisture, or other causes both when in use and when not in use, which disadvantage it is the object of this invention to overcome. By this warping or springing of the curved teeth or tines the efficiency of the picker is reduced, owing to the fact that some of the tines become separated too great a distance at their free ends to properly strip or pick the berries, which if stripped from the vines pass down through the widely-separated teeth or tines and are lost.

The present invention has for its object to provide a cranberry-picker in which the tines are adjustably secured, so that they may be turned or rotated to properly space them and so that they may be adjusted vertically to bring the free ends of the teeth in alinement. To this end the tines or teeth are clamped to a head or support forming part of the box, receptacle, or scoop, and I prefer to employ a clamp for each tooth or tine, in which clamp said tooth or tine is rotatable to enable it to be turned to bring its free end in proper relation to an adjacent tooth or tine. The head referred to is provided with substantially semicircular bearing-sockets, in which the teeth or tines are supported. These and other features of this invention will be pointed out in the claims at the end of this specification.

Figure 1 is a plan view of one form of cranberry-picker embodying this invention; Fig. 2, a side elevation, with parts broken away, of the picker shown in Fig. 1; Figs. 3 and 4, details in section to be referred to, Fig. 4 being a section on the line 4 4, Fig. 3; Figs. 5, 6, and 7, modifications to be referred to.

The box or scoop $a$, open at its front, may be of any usual or suitable construction. The scoop $a$ is provided with a plurality of tines or teeth $b$, pointed at their free ends and usually made of wood. The tines $b$ in accordance with this invention are secured to a head $c$, which is suitably fastened to the scoop and is provided with a slot or channel $d$, extended longitudinally of the head, and with a plurality of substantially semicircular sockets $e f$ in its upper surface on each side of said channel or slot, which sockets extend transversely of the head, each socket $f$ being in alinement with and practically forming a continuation of a socket $e$. The teeth or tines $b$ are made cylindrical at their rear end and have a bearing in the sockets $e f$ and are capable of rotating therein, so as to enable said tines to be turned to compensate for warping or springing of the wood, and thus adjust their free ends, so that they may be evenly spaced apart. The tines are firmly held in their adjusted position by cylindrical clamping devices, preferably one for each tine, and which may be made as herein shown, said clamping device being shown in Figs. 1 and 3 as a sleeve 10 of substantial length, which embraces the portion of the tine above the slot or channel $d$ and which is provided with a depending rod 12, extended down through the head and fastened against upward movement, which may be accomplished by means of a nut 13, which engages the threaded end of the said rod, as clearly represented in Figs. 3 and 4, a washer 14 being interposed between the said nut and head.

By reference to Figs. 3 and 4 it will be seen that by tightening up against the nut 13 the clamp 10 draws the rear end of the tooth or tine down into firm engagement with the head and clamps or holds the same to the latter. By loosening the nut the pressure upon the tine is relieved sufficiently to enable the latter to be turned in the sleeve 10, so as to adjust the pointed or free end of the tine with relation to an adjacent tine, and thus compensate for warping or springing of the wooden tines. After the tines have been adjusted they may be rendered fast to the head by screwing up the nuts 13.

The sockets $f$ may and preferably will extend but partially across the head to leave a shoulder 16, against which the rear end of the tine may bear to restrain the tine from movement backward. So, also, it will be noticed that the clamping device or sleeve 10 engages the tine intermediate its bearings, which permits the free or pointed ends of the tines to be adjusted vertically, so as to bring them in horizontal alinement by the insertion of a shim or thin piece 17 of metal or other suitable material in the socket e, as represented in Fig. 5.

I may prefer to make the clamping-sleeves separate for each tine and in a single piece; but I do not desire to limit my invention in this respect, as said clamping devices may be made in two parts and the upper and lower halves of a plurality of parts joined together, as represented in Fig. 6.

From the above description it will be seen that the teeth or tines are not only rotatably adjustable, but that in case they become broken they can be removed and replaced substantially in an instant.

In Fig. 7 is shown another modification of the clamping device, which consists in a plate or strip of metal having a plurality of substantially semicircular bends 25 to fit over the tines b and a bolt 26 at each side of the tine. I may form a plurality of the bends 25 in a single piece; but, if desired, I may employ a single bend and secure the clamp to the head c by a bolt 26 on each side of the said clamp.

I claim—

1. In a cranberry-picker, in combination, a box or scoop provided with a head extended transversely of said box or scoop and provided with a longitudinally-extended slot or channel and with transversely-extended round bearing-sockets on opposite sides of said slot or channel, a plurality of teeth or tines having their rear ends circular in form to fit said bearing-sockets, sleeves fitted on said tines between said bearing-sockets and provided with depending rods extended through said head, and nuts engaging the projecting ends of said rods, substantially as described.

2. In a cranberry-picker, in combination, a box or scoop provided with a head having in its upper face a plurality of substantially semicircular sockets open upward, a plurality of teeth or tines resting in said sockets and extended from said head, and clamping means secured to said head and in engagement with the exterior surface of said tines to frictionally secure the same to said head, said clamping means permitting said tines to be rotated in their sockets while said tines remain in engagement with said clamping means, substantially as described.

3. In a cranberry-picker, in combination, a box or scoop provided with a head having a longitudinally-extended slot or channel in its upper surface intermediate its sides to form bearing-surfaces for the tines or teeth, said tines or teeth extended across said channel or slot and supported by said bearing-surfaces, clamping means engaging said tines in line with said slot or channel, and means to secure said clamping means to said head, substantially as described.

4. In a cranberry-picker, in combination, a box or scoop provided with a head extended transversely of said box or scoop and provided with a longitudinally-extended slot or channel and with transversely-extended round bearing-sockets on opposite sides of said slot or channel, a plurality of teeth or tines having their rear ends circular in form to fit said bearing-sockets, sleeves fitted on said tines between said bearing-sockets and provided with depending rods extended through said head, and means to secure said rod to said head against upward movement, substantially as described.

5. In a cranberry-picker, in combination, a scoop or receptacle for the berries, a plurality of teeth extended therefrom, bearing-surfaces for the rear ends of said teeth, clamping devices engaging said teeth between said bearing-surfaces, and means coöperating with said clamping devices to cause the teeth to be firmly held in engagement with their bearing-surfaces, substantially as described.

6. In a cranberry-picker, in combination, a scoop or receptacle for the berries, a plurality of teeth extended therefrom, bearing-surfaces for the rear ends of said teeth, said bearing-surfaces being separated to form a slot or channel, and means engaging said teeth in line with said slot or channel to clamp the rear end of said teeth to their bearing-surfaces, substantially as described.

In testimony whereof I have signed my name to this specification in the presence of two subscribing witnesses.

GEORGE H. CHANDLER.

Witnesses:
 DANA B. BLACKMAN,
 LAURENCE E. BLACKMAN.